Aug. 12, 1924.     1,504,452
F. G. HIRST
LUBRICATING BOLT
Original Filed March 24, 1921
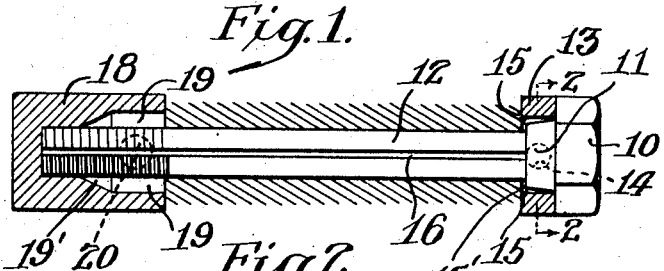
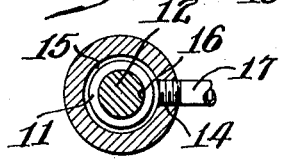
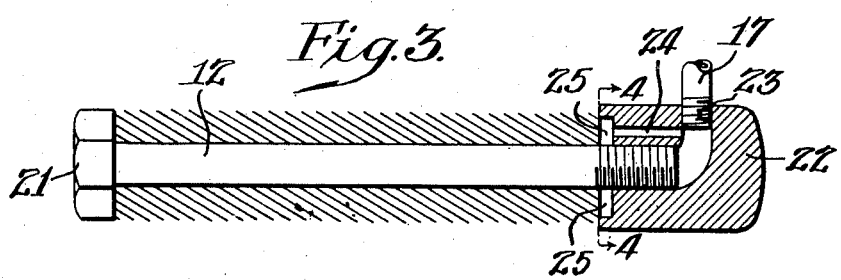
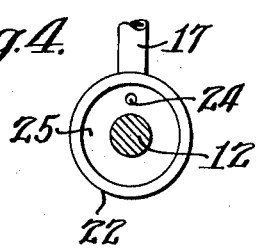
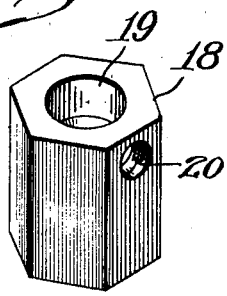
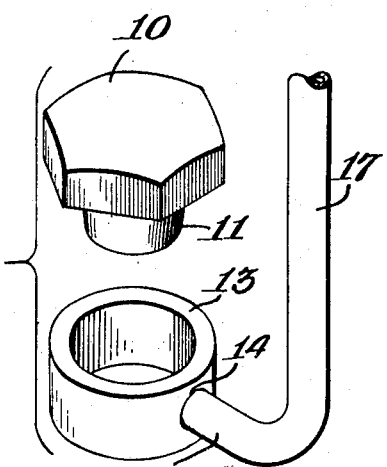
Inventor:
Franklin G. Hirst.
by M. van Boostirk
his Attorney.
Witness:
Walter Elson.

Patented Aug. 12, 1924.

1,504,452

UNITED STATES PATENT OFFICE.

FRANKLIN G. HIRST, OF PHILADELPHIA, PENNSYLVANIA.

LUBRICATING BOLT.

Application filed March 24, 1921, Serial No. 455,066. Renewed December 8, 1923.

*To all whom it may concern:*

Be it known that FRANKLIN G. HIRST, a citizen of the United States, residing at Philadelphia, in the county of Philadelphia and State of Pennsylvania, has invented certain new and useful Improvements in Lubricating Bolts, of which the following is a specification.

My invention relates to lubricating bolts useful for securing together the leaves of springs for automobiles or other vehicles, as well as for securing together shackles, hangers, or other machine parts. The invention is especially concerned with the transmission of lubricant between the bolt and other parts at its end. I aim to accomplish this as efficiently as possible, with minimum liability to clogging up of the lubricant passages, such as would exist in the case of passages formed by drilling the bolt axially half its length and then at right angles. I also aim to accomplish the transmission of lubricant by means of simple and inexpensive devices, easily installed or taken apart even by unskilled persons, and to utilize the head member of the bolt for the purpose.

I have hereinafter described embodiments of my invention comprising head members for the bolt, both fixed and removable. While these embodiments are the best known to me, so that in its narrower aspects, invention extends to various specific features and details here shown and described,—it will be understood, nevertheless, that in its broader aspects the invention is not limited to such embodiments, but can be otherwise carried out, embodied, and applied.

In the drawings, Fig. 1 is a side view of a lubricating bolt and associated parts embodying my invention in preferred form,—various parts being in section, and the forms of lubricating heads shown in Figs. 5 and 6 being at the opposite ends of the bolt.

Fig. 2 shows a transverse section taken as indicated by the line 2—2 in Fig. 1.

Fig. 3 is a view similar to Fig. 1, showing a bolt with an ordinary integral head member at one end and a form of cap nut different from those shown in Figs. 5 and 6 at its other end.

Fig. 4 shows a transverse section taken as indicated by the line 4—4 in Fig. 3.

Figs. 5 and 6 are perspective views of cap nuts like the bolt heads shown at the left and right of Fig. 1, respectively.

The bolt head shown at the right of Fig. 1 and in Figs. 2 and 6 comprises a part 10 in form resembling an ordinary hexagonal bolt head with a taperingly reduced shoulder or shank 11 (of less diameter than the head) at its abutting side, adjacent the bolt shank 12. Besides the part 10, the bolt head as a whole comprises an annular hollow collar part 13 fitting and engaging about the shoulder 11 against the head portion proper of the part 10, and thereby centered about the part 10. This collar 13 has a lateral lubricant opening or port 14, and affords passage for lubricant to or from the bolt shank 12. As shown, this passage is afforded lengthwise of the bolt by a clearance 15 due to the taper of the shoulder 11, and transversely or radially by a clearance 15' due to the fact that the collar 13 extends lengthwise of the bolt beyond the shoulder 11, owing to the relative shortness of the latter. As shown, the bolt 12 has a longitudinally extending recess or groove 16 milled or pressed in its outer surface. A lubricant-conveying pipe or conduit 17 is screwed into the lateral opening 14 of the collar 13.

In this form of device, the clearances 15 and 15' in effect form a facial recess or counterbore in the bolt head member composed of the parts 10 and 13, communicating directly with the bolt shank 12 on the one hand, and with the port 14 and the conduit 17 on the other hand.

In Fig. 1, the head 10 proper (with its tapering shoulder 11) is shown as an integral bolt head at one end of the bolt shank 12; while in Fig. 6, the head 10 proper is shown as a separate head member or cap nut part, internally threaded to screw on the threaded end of the bolt shank.

For convenience, and in correspondence to its structural relation to the bolt 12, the part 10 of Fig. 6 may itself be referred to as a removable head member or cap nut; although in reference to the lubricating functions of the device, the term naturally includes the part 13 as well.

It will readily be understood, of course, that the cap nut device 10, 13 may be used on one end of a bolt 12 having at its other end the ordinary, conventional form of bolt head 21 shown in Fig. 3; i. e., the cap nut 10, 13 may be used on the bolt shown in Fig. 3 in lieu of the cap nut 22 actually shown in that figure; so, likewise, may the nut 18 shown at the left of Fig. 1 and in Fig. 5.

The removable one-piece or bolt head member or cap nut 18 shown at the left of Fig. 1 and in Fig. 5 has likewise a facial recess formed by an opening or well counterbored at 19 in its abutting face, and hence at its mouth of greater circumference than the bolt 12, so as to afford a clearance about the latter.

The cap nut 18 has also likewise a lateral screw-threaded opening or port 20, for a lubricating conduit such as 17, directly into the counterbore 19. The counterbore 19 extends, substantially, beyond the lateral opening 20, terminating in a taper 19' by which the counterbore merges into the internally screw-threaded portion of the cap opening that takes the bolt end.

The removable one-piece bolt head member or cap nut 22 shown in Figs. 3 and 4 is internally screw-threaded to take the threaded end of the bolt 12, and has a lateral screw-threaded opening or port 23 for a lubricant conduit 17. Through a longitudinal passage 24 in the cap nut 22, the opening 17 communicates with the facial recess or well counterbored at 25 in the abutting face of the cap nut,—of greater circumference than the bolt 12, so as to afford a clearance around the latter. Thus the lubricant traversing the shank 12 can pass directly to the recess or counterbore 25, or vice-versa,— just as in the case of the corresponding features in Figs. 1, 2, 5, and 6.

In use, the lubricant supplied the bolt 12 from any of the forms of bolt head or cap nut described flows along the shank, and is thence distributed to whatever the bolt is securing. In some cases, the shank 12 may be grooved longitudinally for the passage of the lubricant externally therealong, as it appears in Fig. 1. In other cases,—as with automobile or other leaf springs, on the other hand, the bolt 12 may preferably be ungrooved, as it appears in Fig. 3; and space for external passage of lubricant along it (for distribution between the individual spring leaves, or to whatever other object the bolt secures) may be provided between the bolt and the walls of the opening in which it is accommodated.

In Fig. 6, the supply pipe 17 is shown L shaped, and as extending substantially above the normal position of the cap nut 10 with reference to the collar 13. In any case, the pipe 17 may extend to a sufficient height to afford pressure head for causing the lubricant to flow to the level desired. Of course, a cap may be secured over the open end of the pipe 17 to seal it.

In order to apply one of my cap nuts, it is only necessary to remove the nut supplied with the bolt on which mine is to be used and substitute mine.

The reason for ordinarily preferring the device 10, 13 is that the collar 13 can be adjusted by the user to bring the opening 14 for the pipe 17 to the exact position desired just before the nut 10 is finally tightened; whereas with the device 18 or 22, the opening for the pipe 17 may unavoidably come at the wrong place when the nut is properly tightened on the bolt 12, so that the user may either have to back the nut off, or may strip the threads in attempting to turn it sufficiently the other way.

Having thus described my invention, I claim:

1. A lubricating bolt with external passage for lubricant along its shank having a head member with a lateral opening for a lubricant conduit and a recess in its abutting face adjacent the shank communicating with said opening, so that lubricant traversing said shank may pass therefrom directly to said recess and thence to said conduit, or vice-versa.

2. A lubricating bolt having external passage for lubricant along its shank, with a nut counterbored from its abutting face and having an opening for a lubricating conduit communicating with said counterbore, so that lubricant traversing said shank may pass therefrom directly to said counterbore and thence to said conduit, or vice-versa.

3. A lubricating bolt having external passage for lubricant along its shank, with a nut counterbored from its abutting face and having a lateral opening for a lubricating conduit into said counterbore, so that lubricant traversing said shank may pass therefrom directly to said counterbore and thence to said conduit, or vice-versa.

4. A lubricating bolt with a shoulder adjacent its head, and a hollow part engaging about said shoulder having a lateral opening for lubricant and affording passage therefor to or from the bolt shank.

5. A lubricating bolt with a tapering shoulder on the abutting side of its head, and a hollow part engaging and thereby centered about said shoulder, and affording passage for lubricant to or from the bolt shank.

6. A lubricating device for a lubricating bolt comprising a cap nut for the bolt with a shoulder at its abutting side; and a collar adapted to engage about said shoulder and extend beyond it, and to afford passage for lubricant to or from the bolt shank.

7. A lubricating device for a lubricating bolt comprising a cap nut for the bolt with a tapering shoulder, a collar adapted to fit over and extend beyond said shoulder, there being an opening in said collar; and lubricant-conveying means in said opening.

8. The combination with a lubricating bolt having a longitudinally extending recess, of a cap nut therefor having a tapering shoulder, a collar fitting over and extending beyond said shoulder, there being an opening in said collar, and means in said opening for conveying lubricant to or from said recess.

9. A lubricating device for a lubricating bolt comprising a cap nut for the bolt with a tapering shoulder, a collar adapted to fit over and extend beyond said shank having an opening therein, and lubricant-conveying means in said opening; the taper and shortness of said shoulder relatively to said collar affording passage for lubricant to or from the bolt shank.

10. A cap nut for a lubricating bolt having a lateral opening for a lubricant conduit and an opening in its abutting face larger than the bolt, counterbored, substantially, beyond said lateral opening, and therebeyond internally screw-threaded to screw on the bolt.

11. The combination with a longitudinally grooved lubricating bolt, of a cap nut having a lateral opening for a lubricant conduit and an opening in its abutting face larger than the bolt, counterbored, substantially, beyond said lateral opening, and therebeyond internally screw-threaded to screw on the bolt; said opening in the abutting face of the bolt serving to admit lubricant to the groove in the bolt.

In testimony whereof I affix my signature.

FRANKLIN G. HIRST.